(12) United States Patent
Ahad

(10) Patent No.: US 10,315,773 B1
(45) Date of Patent: Jun. 11, 2019

(54) SEAT SYSTEM HAVING AN ADJUSTABLE WRAPAROUND HEADREST

(71) Applicant: TIMCO Aviation Services, Inc., Greensboro, NC (US)

(72) Inventor: Sam J. Ahad, Santa Clarita, CA (US)

(73) Assignee: HAECO Americas, Inc., Greensboro, NC (US)

(*) Notice: Subject to any disclaimer, the term of this patent is extended or adjusted under 35 U.S.C. 154(b) by 245 days.

(21) Appl. No.: 15/347,112

(22) Filed: Nov. 9, 2016

Related U.S. Application Data

(60) Provisional application No. 62/266,991, filed on Dec. 14, 2015.

(51) Int. Cl.
*B60N 3/00* (2006.01)
*B60N 2/812* (2018.01)
*B60N 2/838* (2018.01)
*B60N 2/882* (2018.01)
*B60N 2/885* (2018.01)
*B64D 11/00* (2006.01)
*B64D 11/06* (2006.01)

(52) U.S. Cl.
CPC .......... *B64D 11/0642* (2014.12); *B60N 2/812* (2018.02); *B60N 2/838* (2018.02); *B60N 2/882* (2018.02); *B60N 2/885* (2018.02); *B60N 3/004* (2013.01); *B64D 11/00151* (2014.12); *B64D 11/0638* (2014.12); *B64D 11/0647* (2014.12)

(58) Field of Classification Search
CPC ............ B64D 11/0642; B64D 11/0638; B64D 11/0647; B64D 11/00151; B60N 2/885; B60N 2/882; B60N 3/004; B60N 2/809; B60N 2/812; B60N 2/838; B60R 2011/0017
USPC ..... 297/406, 217.4, 173, 163, 410, 408, 397
See application file for complete search history.

(56) References Cited

U.S. PATENT DOCUMENTS

| | | | |
|---|---|---|---|
| 5,967,613 A | 10/1999 | McKeever | 297/397 |
| 6,250,716 B1 | 6/2001 | Clough | 297/408 |
| 6,539,560 B1 | 4/2003 | Grieco et al. | 4/523 |
| 7,080,886 B2 | 7/2006 | Bauer | 297/409 |
| 7,144,083 B2 * | 12/2006 | List | B60N 2/885 297/391 |
| 7,213,884 B2 | 5/2007 | Flory et al. | 297/398 |
| 7,506,926 B2 | 3/2009 | Carine | 297/216.12 |
| 7,631,935 B2 | 12/2009 | Chen et al. | 297/284.9 |
| 8,911,020 B2 | 12/2014 | Westerink et al. | 297/407 |

(Continued)

*Primary Examiner* — Milton Nelson, Jr.
(74) *Attorney, Agent, or Firm* — MacCord Mason PLLC

(57) ABSTRACT

A seat system for a passenger aircraft includes at least one passenger seat and an adjustable headrest attached to the passenger seat. The adjustable headrest includes a plurality of panels including a center panel and at least two pairs of side panels; a plurality of vertically articulated joints each separating each of the pairs one from another; a sliding mechanism such as a rail to facilitate vertical displacement of the plurality of panels, the sliding mechanism connected to the center panel; and a quick release mechanism to facilitate removal of the plurality of panels from the passenger seat, the quick release mechanism engaged with the sliding mechanism. A seat back tray table may further be attached to the back of the passenger seat. The headrest is vertically adjustable, and configured to curve around a passenger's head to provide comfort and stability.

40 Claims, 18 Drawing Sheets

(56) References Cited

U.S. PATENT DOCUMENTS

| | | | |
|---|---|---|---|
| 9,028,000 B2 | 5/2015 | Millan | 297/410 |
| 2004/0007910 A1 | 1/2004 | Skelly | 297/406 |
| 2011/0043006 A1* | 2/2011 | Butt | A47C 7/38 297/68 |
| 2013/0147240 A1* | 6/2013 | Lee | B60N 2/22 297/188.05 |

* cited by examiner

SEAT SYSTEM HAVING AN ADJUSTABLE WRAPAROUND HEADREST

CROSS-REFERENCE TO RELATED APPLICATIONS

This application claims the benefit of U.S. Provisional Patent Application No. 62/266,991 filed Dec. 14, 2015, entitled SEAT SYSTEM HAVING AN ADJUSTABLE WRAPAROUND HEADREST.

BACKGROUND OF THE INVENTIONS

(1) Field

The present inventions relate generally to seat systems for passenger vehicles and, more particularly, to a seat system having an adjustable wraparound headrest for a passenger aircraft.

(2) Related Art

Passenger seats on passenger aircraft, buses, trains and ferries are generally arranged so that each passenger seat, other than the most forward located passenger seats, faces the back of the next forward passenger seat.

Many passenger seat backs are utilized to install amenities for the passengers' use during the trip. For example, an upper surface of the seat back may be used to install inflight entertainment, other display devices and/or as an area for additional storage of amenities, such as reading materials or passenger safety cards. In some instances, a seat back tray table may be attached adjoining the lower portion of the seat back. The tray table is deployed by the passenger to provide a flat surface for eating, working, recreation, or other uses.

The challenge in designing passenger seats lies in satisfying the airlines' interests and the passengers' interests. While airlines prefer seats that are lightweight, economical and require a small amount of space on a plane, passengers prefer seats that are comfortable, not cramped, and that lend themselves to sleeping.

Passengers trying to sleep on airplanes often experience unpleasant "head bobbing". More specifically, when they begin to fall asleep their neck muscles relax, their head tilts, they wake a bit and return their head to neutral position, begin to fall asleep again, their neck muscles relax, their head tilts again, and so forth. This cycle can prevent sound sleep, so it is desirable for passengers to stabilize their head. Known means of stabilization include various headrests, neck pillows, reclining the seat as far as possible, and leaning in various positions. However, these attempts at stabilization are inadequate, annoy other passengers, require bringing additional items onto a plane and/or are not possible depending on the configuration of the airline seat.

Thus, there remains a need for a new and improved seat system for a passenger aircraft having an adjustable headrest adapted to be received by the back of the passenger seat headrest. It is desirable that this improved seat system stabilizes a passenger's head in the neutral upright position. It is also desirable that the headrest can be easily added to pre-existing seats, and easily removed.

SUMMARY OF THE INVENTIONS

The present inventions are directed to a seat system for a passenger aircraft. The seat system includes at least one passenger seat and an adjustable headrest attached to the passenger seat. The adjustable headrest includes (i) a plurality of panels including a center panel and at least two pairs of side panels; (ii) a plurality of vertically articulated joints each separating each of the pairs one from another; (iii) a sliding mechanism such as a rail to facilitate vertical displacement of the plurality of panels, the sliding mechanism connected to the center panel; and (iv) a quick release mechanism to facilitate removal of the plurality of panels from the passenger seat, the quick release mechanism engaged with the sliding mechanism. A seat back tray table may further be attached to the back of the passenger seat.

The uppermost edges of the panels of the adjustable headrest may be substantially linearly aligned. Also, the bottommost edges of the panels may be substantially linearly aligned. Also, an elongated gap may be formed between each panel, with each gap substantially similar and parallel one-to-another.

Also, the plurality of panels may be greater than 3 panels. In one embodiment, the plurality of panels is 5 panels including the central panel and two pair of side panels.

The distal ends of the outermost two panels of the plurality of panels may be thickened. Also, the surface area of the front surface of the center panel may be less than the surface area of the back surface of the center panel.

The plurality of vertically articulated joints may each each consist of a hinge integrally formed from adjacent panels. Also, the vertically articulated joints may each further include a torque insert. In one embodiment, the torque insert provides 100% of a specified torque in one direction, and less than 100% of the specified torque in the opposite direction. The vertically articulated joints may each also include a mechanical stop.

In one embodiment, the adjustable headrest further includes a mounting bracket releasably engaged with the sliding mechanism, the mounting bracket configured for substantially permanent attachment to a passenger airline seat back. The mounting bracket preferably includes a carriage or a plurality of low friction bearings for receiving the sliding mechanism.

The quick release mechanism may be a friction leaf spring. The quick release mechanism may also include a lever for disengaging from the sliding mechanism.

The seat back tray table attached to the back of the passenger seat may be movable between a first storage position and a second deployed position. Also, the passenger seat may further include a display attached to the back of the passenger seat.

In one embodiment, the passenger seat includes a base frame, a seat component attached to the base frame and a backrest attached to the base frame adjoining the seat component.

The passenger seat may further include an upholstery package. The passenger seat may also further include a trim package.

The present inventions also include a method of manufacturing an adjustable headrest for a passenger seat. The method includes the steps of injection molding a plurality of panels positioned in a row; and simultaneously overmolding a plurality of torque inserts, each torque insert positioned between two panels.

The step of injection molding a plurality of panels may include the step of injection molding 5 panels. The step of injection molding a plurality of panels may also include the step of injection molding a plurality of hinges contiguous with the panels. The step of simultaneously overmolding a plurality of torque inserts may include the step of overmolding the torque inserts within the hinges.

Accordingly, one aspect of the present inventions is to provide a seat system for a passenger aircraft, the seat system includes (a) at least one passenger seat; and (b) an adjustable headrest attached to the passenger seat, the headrest including a central panel and at least two pairs of side panels positioned in a row, each of the pairs connected to the central panel with a vertically articulating joint between each panel.

Another aspect of the present inventions is to provide an adjustable headrest for a passenger seat, the adjustable headrest includes (a) a plurality of panels including a center panel and at least two pairs of side panels; (b) a plurality of vertically articulated friction joints each separating each of the pairs one from another; (c) a sliding mechanism to facilitate vertical displacement of the plurality of panels, the sliding mechanism connected to the center panel; and (d) a quick release mechanism to facilitate removal of the plurality of panels from the passenger seat, the quick release mechanism engaged with the sliding mechanism.

Still another aspect of the present inventions is to provide a seat system for a passenger aircraft, the seat system includes (a) at least one passenger seat; (b) an adjustable headrest attached to the passenger seat, the adjustable headrest includes (i) a plurality of panels including a center panel and at least two pairs of side panels; (ii) a plurality of vertically articulated joints each separating each of the pairs one from another; (iii) a sliding mechanism to facilitate vertical displacement of the plurality of panels, the sliding mechanism connected to the center panel; and (iv) a quick release mechanism to facilitate removal of the plurality of panels from the passenger seat, the quick release mechanism engaged with the sliding mechanism; and (c) a seat back tray table attached to the back of the passenger seat.

These and other aspects of the present inventions will become apparent to those skilled in the art after a reading of the following description of embodiments when considered with the drawings.

DESCRIPTION OF THE EMBODIMENTS

In the following description, it is to be understood that such terms as "forward," "rearward," "left," "right," "upwardly," "downwardly," and the like are words of convenience and are not to be construed as limiting terms.

Broadly, an embodiment of the present invention provides a headrest system which detachably connects to the head region of the backrest of a seat. As used herein, "passenger seat" and the like shall refer to standard passenger seats found on airplanes that typically include seat backs, tray tables, displays, base frames, upholstery, trim and so forth.

Each of the passenger seats may include a base frame, a seat component attached to a base frame and a backrest 13 attached to the base frame adjoining the seat component. The backrest 13 may further include a headrest 20. In one embodiment headrest 20 is adjustable to accommodate the height of a passenger.

Figure 1:
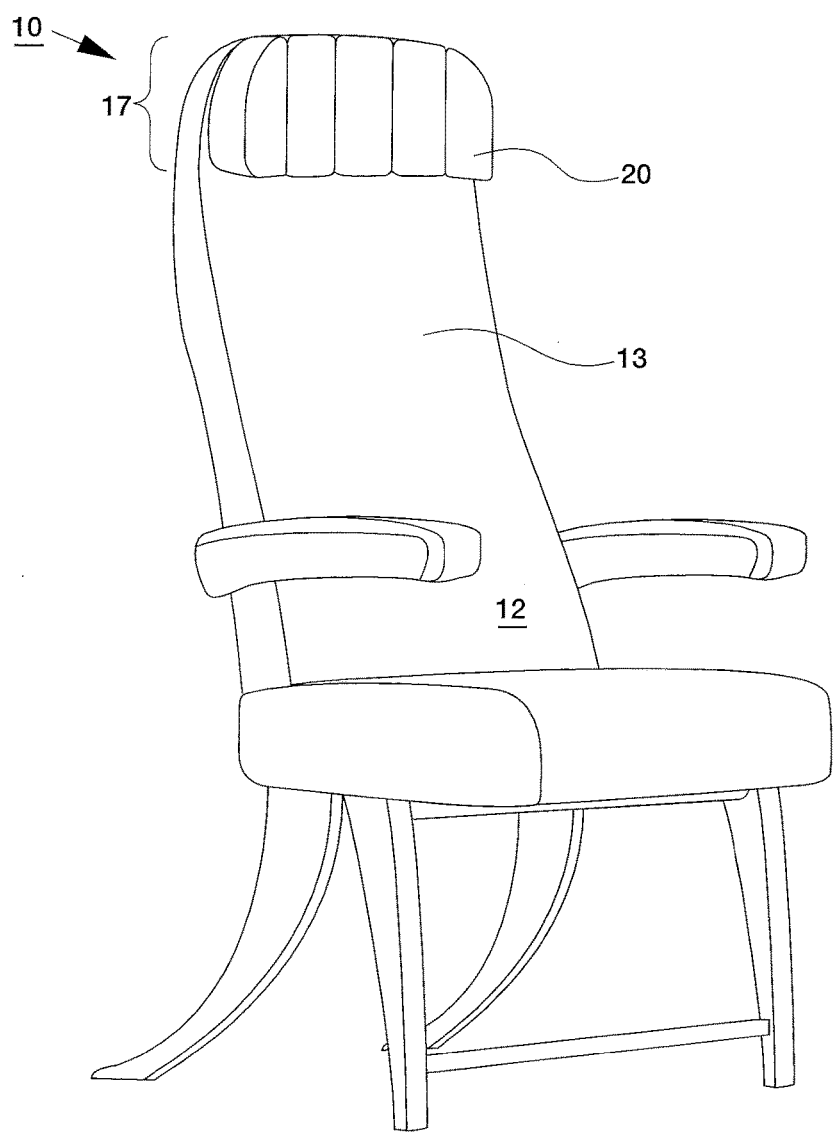
FIG. 1 depicts a seat system having an adjustable wrap-around headrest.

Referring now to the drawings in general and FIG. 1 in particular, it will be understood that the illustrations are for the purpose of describing a preferred embodiment of the inventions and are not intended to limit the inventions thereto. As best seen in FIG. 1, a seat system, generally designated 10, is shown constructed according to the present inventions. The seat system 10 includes at least one passenger seat 12 having backrest 13 with head region 17, and headrest system 20.

Figure 2:
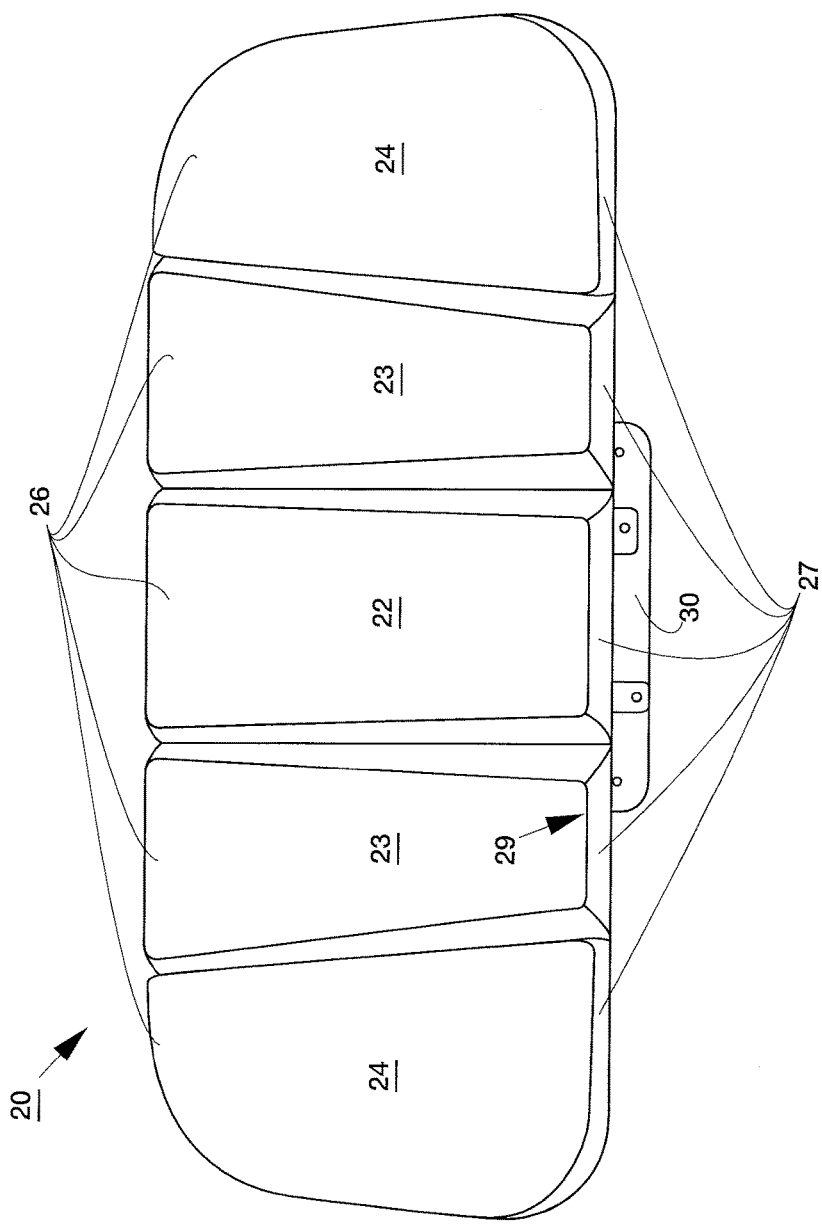
FIG. 2 is a front view of an uncovered headrest in the fully extended position.

As shown in FIG. 2, headrest system 20 includes at least 5 panels: one center panel 22, two proximal panels 23 each adjacent the center panel, and two distal panels 24 each adjacent the proximal panels. While it is preferable to have a single center panel 22, one pair of proximal panels 23, and one pair of distal panels 24, thereby consisting of a total of five panels, it should be understood that it is within the scope of this invention to include additional panels. Also, there can be as few as 3 panels, or more than one center panel 22.

As shown in FIG. 2, it is desirable that uppermost edges 26 of the panels are substantially linearly aligned and that bottommost edge 27 of the panels are also substantially linearly aligned. As used herein, "linearly aligned" shall mean in a line.

Figure 20:
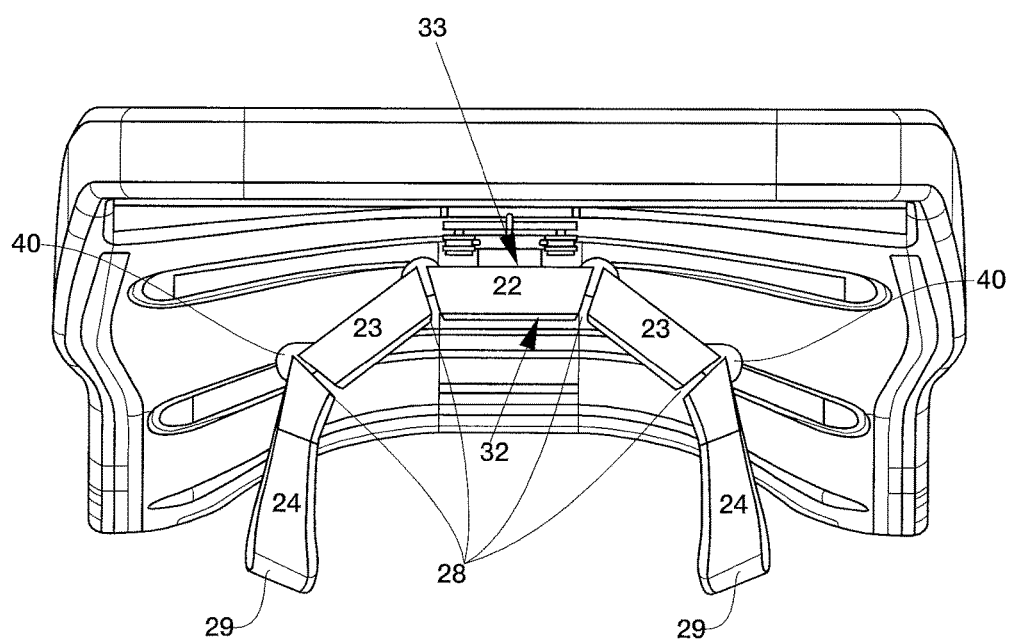
FIG. 20 is a top view of an alternative embodiment with the headrest in the fully curved position.

A novel feature of the present invention is that the panels of headrest system 20 can be adjusted from fully flattened, as shown in FIG. 2, to fully curved, as best shown in FIG. 20, or any degree of curvature between. In the fully flattened position the panels are substantially flush to the passenger seat. In the fully curved position, the panels are oriented to form a curve around a passenger's head with the posterior portion of the head adjacent center panel 22, and thickened portion 29 of distal end 25 preferably positioned near passenger's ears.

Figure 16:
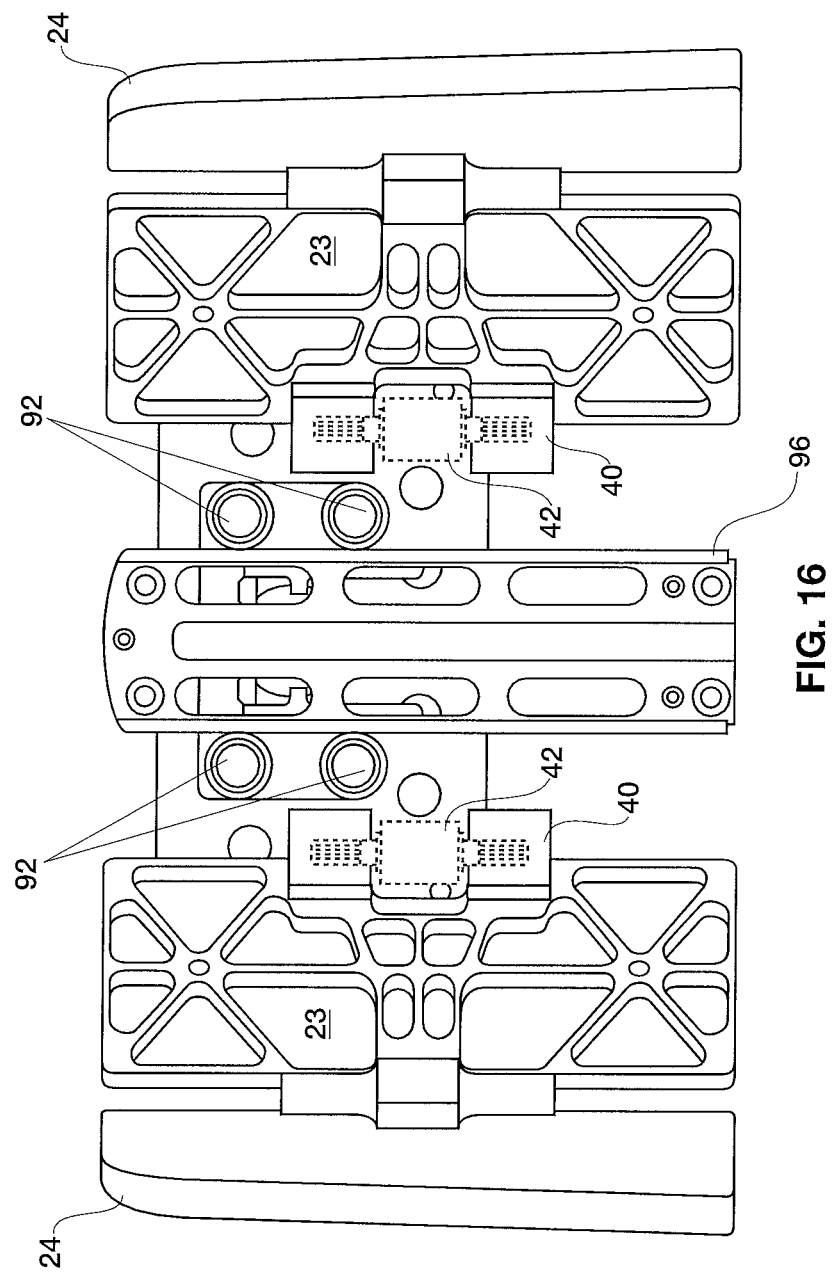
FIG. 16 is a front view of an alternative embodiment of the present invention with the center panel of the headrest missing.
Figure 17:
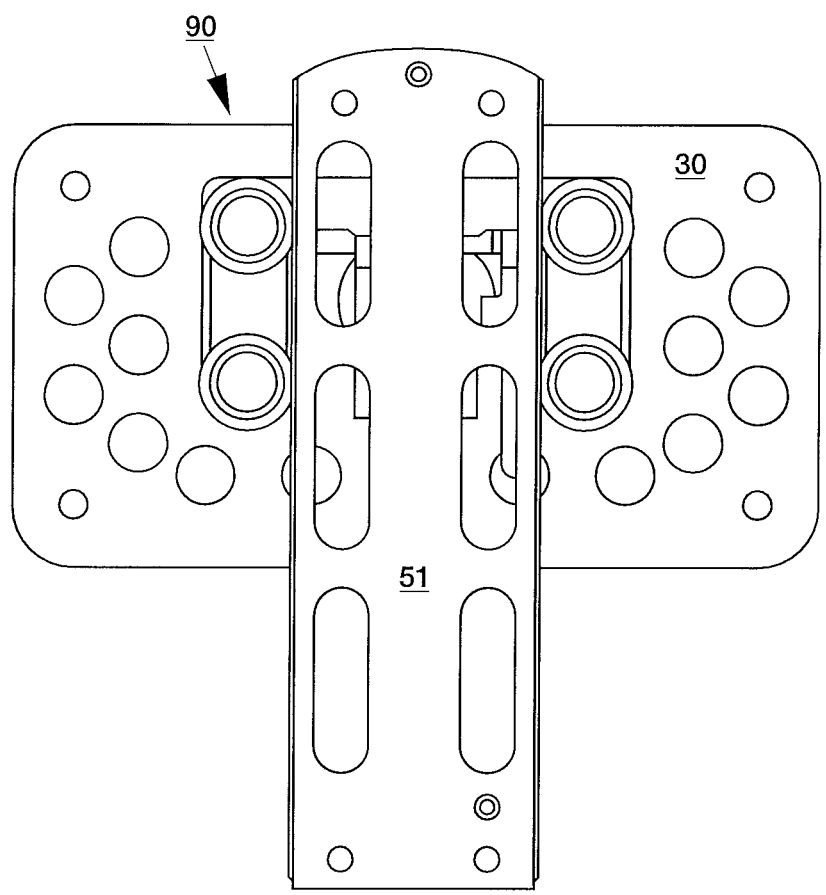
FIG. 17 is an alternative embodiment with the rail in the forefront.
Figure 18:
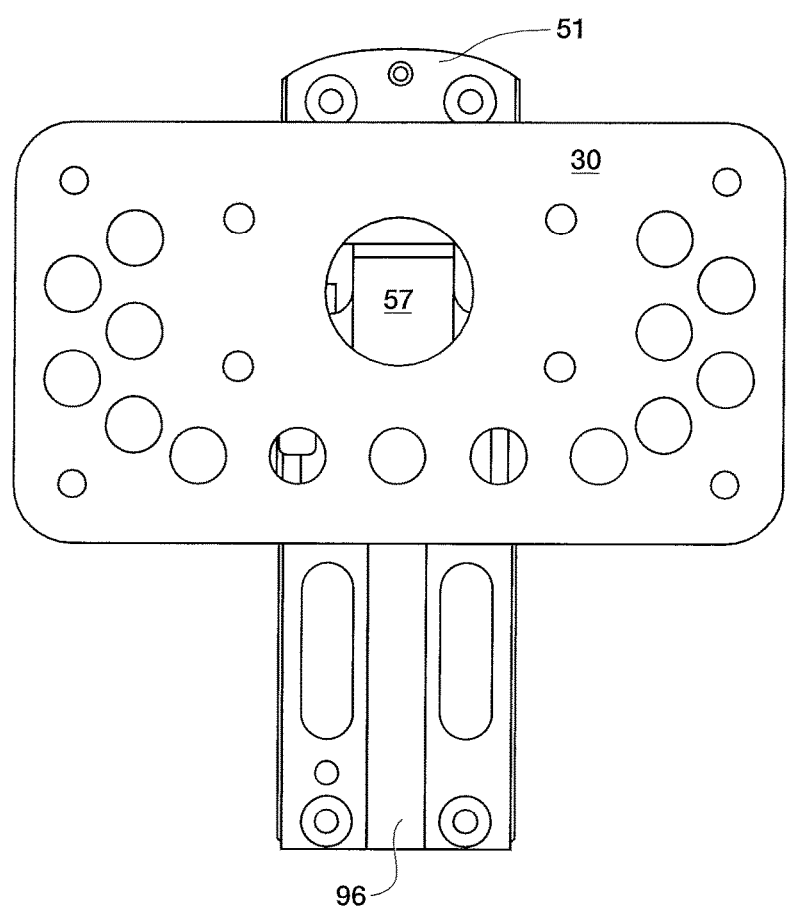
FIG. 18 is an alternative embodiment with the seat mount in the forefront.
Figure 19:
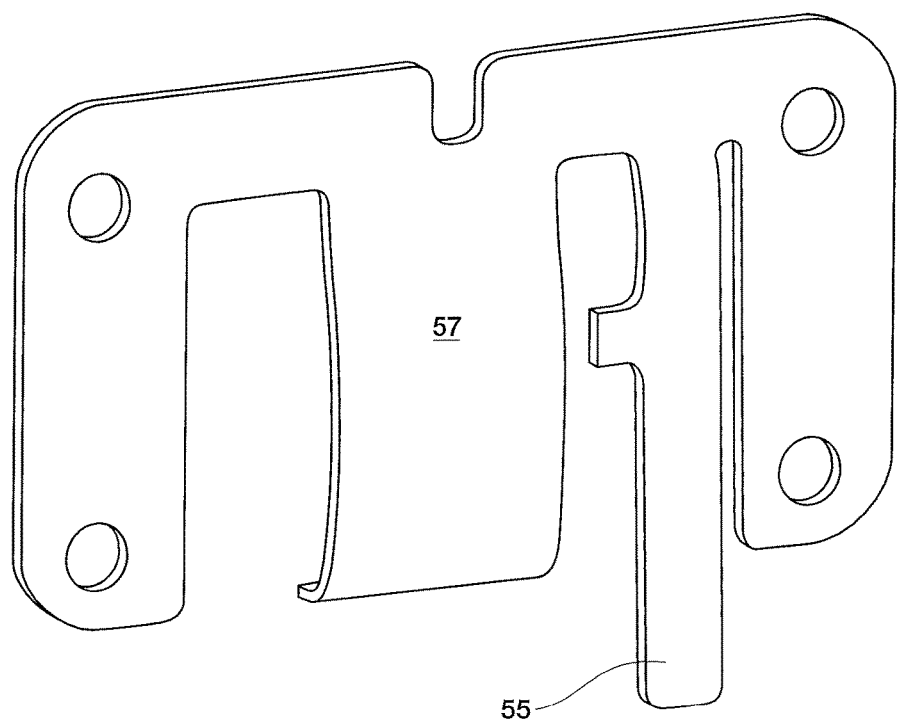
FIG. 19 is a leaf spring.

This adjustability is possible because panels 22, 23, 24 are each separated one from another by joints 40, best shown in FIG. 20. More specifically, as shown in FIG. 16, joints 40 each contain torque insert 42 within. It should be understood that center panel 22 is omitted from FIG. 16 for clarity, but that each joint 40 connects two adjoining panels. Torque insert 42 is preferably a TI-200 series torque insert from Reell Precision Manufacturing Corporation of St. Paul, Minn., and joint 40 is preferably a vertically articulating joint. It is preferred that the torque insert provides 100% of a specified torque in one direction, and less than 100% of that specified torque in the opposite direction. Said another way, the torque inserts should retain position of the panels in the desired position by requiring a greater force to return to neutral position than the force required to position the panels as desired.

One advantage of an embodiment of the present invention is that panels 22, 23, 24, and joints 40 may be formed by injection molding in a single step that simultaneously overmolds torque insert 42. Alternatively, panels may be constructed of a material such as stamped metal or molded plastic with hinges attached between each panel. This embodiment does not incorporate torque inserts, and the panels can rotate almost 360° degrees around the hinge.

Figure 21:
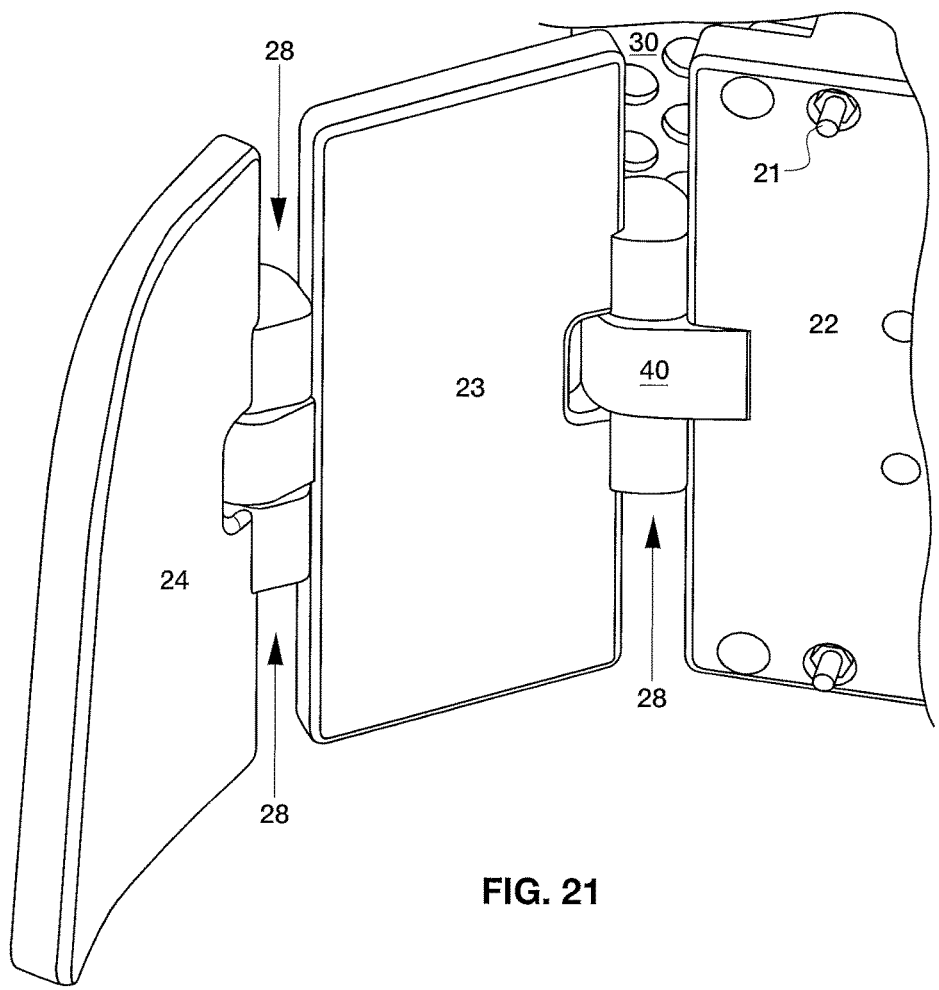
FIG. 21 is a view of a section of a headrest connected to a seat mount.

As shown best in FIG. 21, gap 28 exists between each adjacent panel. It is preferred that each gap is substantially similar and parallel with respect to other gaps. It is also preferred that the orientation of the panels, gaps and joints create a "mechanical positive stop" in so far as mechanical obstruction prevents movement of parts beyond intended range. As shown in FIG. 20, it is also preferred that the cross sectional shape of center panel 22 is trapezoidal, and that surface area of front surface 32 is less than the surface are of back surface 33. Preferably the cross sectional angle of front surface to lateral sides is approximately 35° to 38°.

Figure 3:
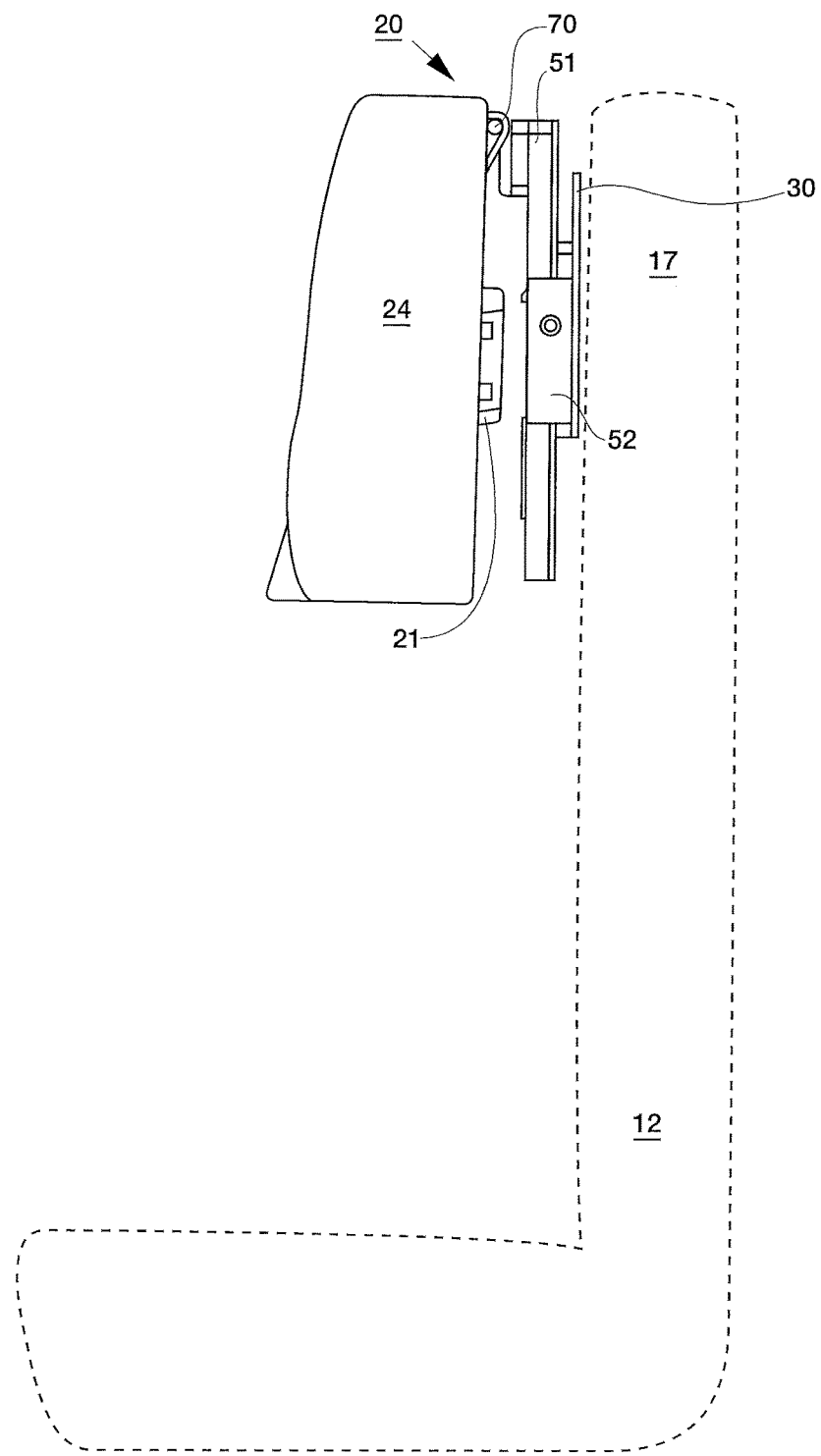
FIG. 3 is a side view of an embodiment of a headrest in non-tilted position.

Referring now to FIG. 3, headrest system 20 is slidably affixed to passenger seat 12 at seat mount 30 such that headrest portion (shown in profile as distal panel 24) slides up and down relative to head region 17 of passenger seat, but seat mount 30 is substantially immovably affixed to head region 17. This allows a passenger to adjust the height of their headrest based on height and/or preference.

Figure 4:
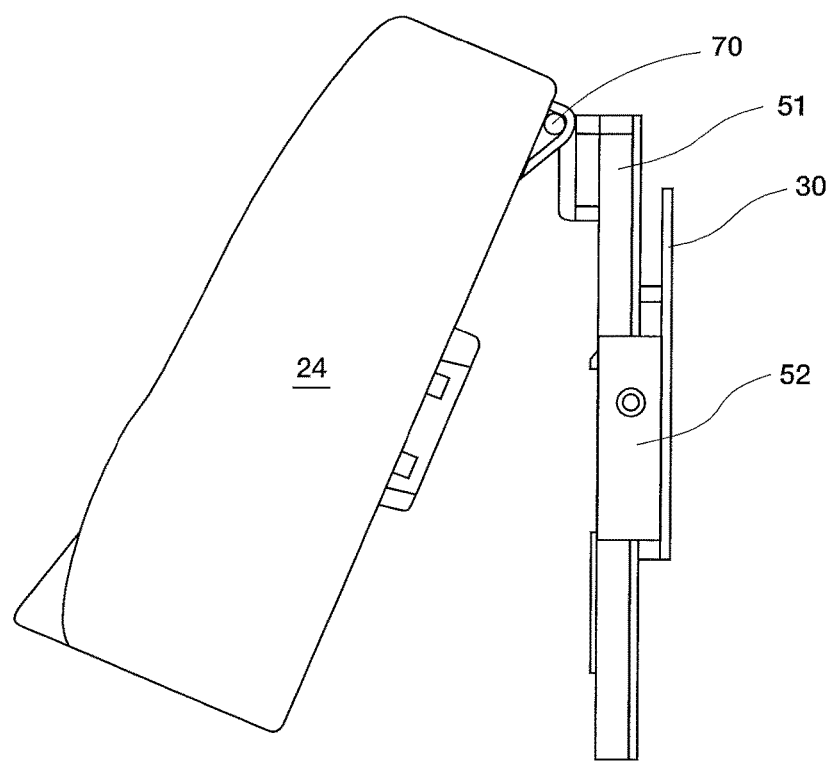
FIG. 4 is a side view of an embodiment of a headrest in a tilted position.
Figure 5:
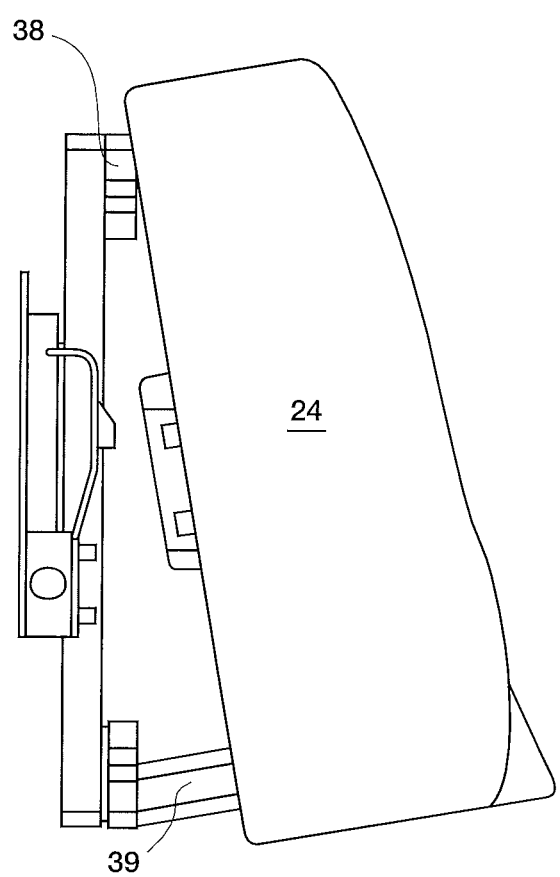
FIG. 5 is a side view of an alternative embodiment of a headrest in a tilted position
Figure 15:
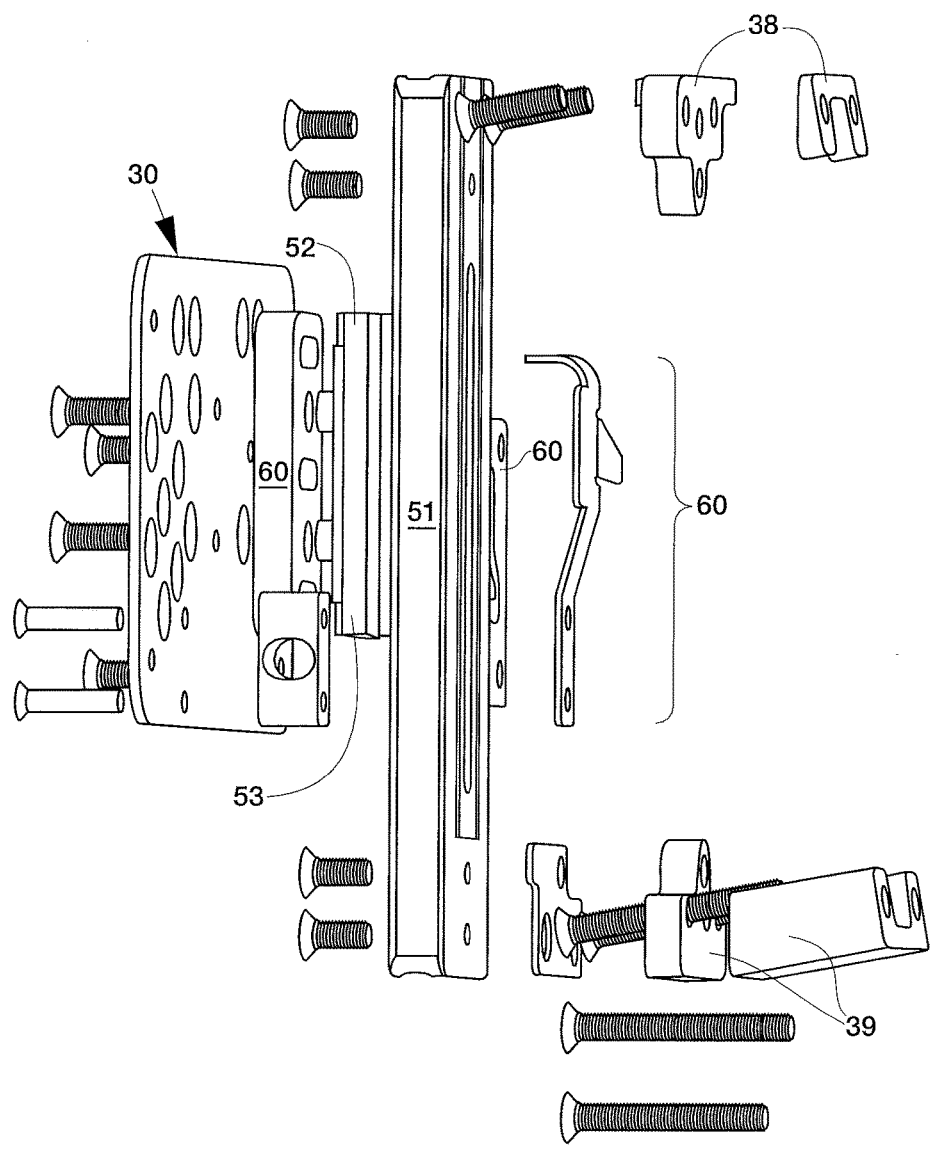
FIG. 15 is an exploded view of structures of an embodiment.

In the embodiment of FIG. 3 the headrest portion is pivotable with respect to seat mount 30 and head region 17 due to horizontal hinge 70. This is depicted in FIG. 4. Other embodiments, for example that shown in FIGS. 5 and 15, lack a horizontal hinge 70. Instead, upper shims 38 and lower shims 39 are employed to achieve the desired angle of headrest portion relative to seat mount 30. Regardless of the whether the angle of the headrest is adjusted by a horizontal hinge or preset using shims, an upward tilt in a range of approximately 0° to approximately 10° is preferred, with approximately 5° most preferred.

Figure 6:
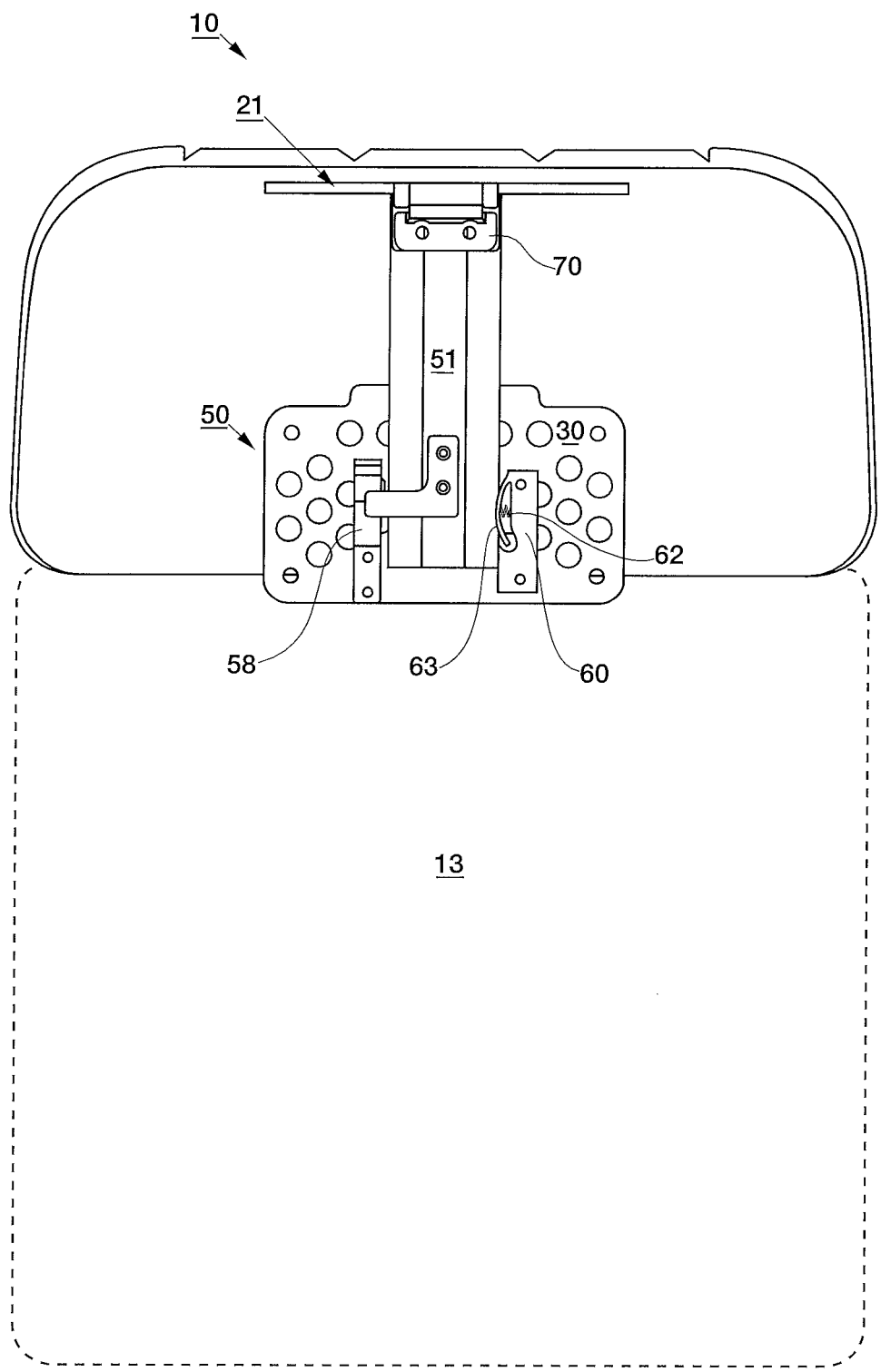
FIG. 6 depicts a rail engaged with a seat mount, with the rail in front of the seat mount.
Figure 9:
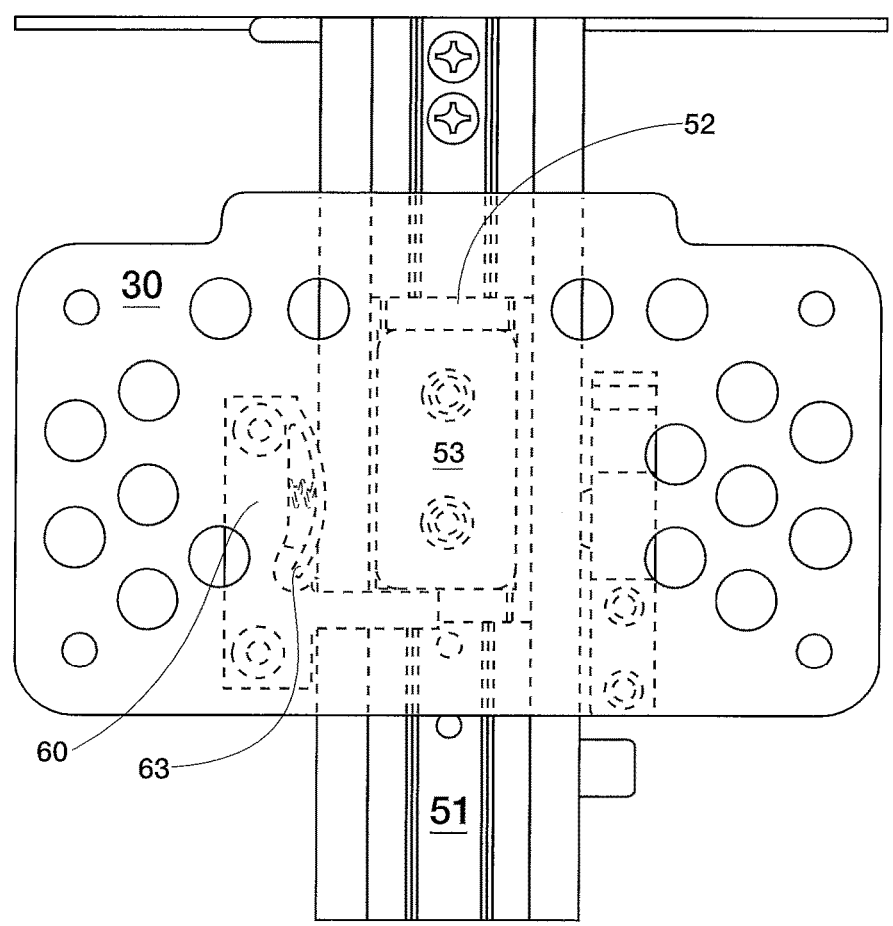
FIG. 9 depicts a rail engaged with a seat mount, with the seat mount in front of the rail.
Figure 13:
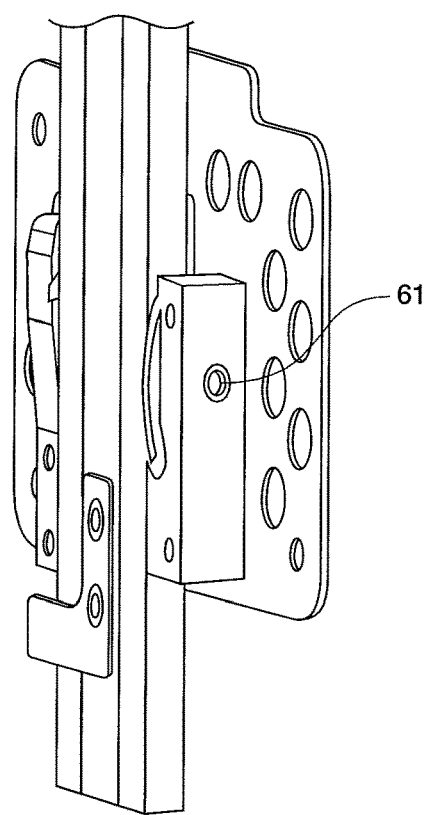
FIG. 13 depicts a friction assembly in perspective view including a set screw.
Figure 14:
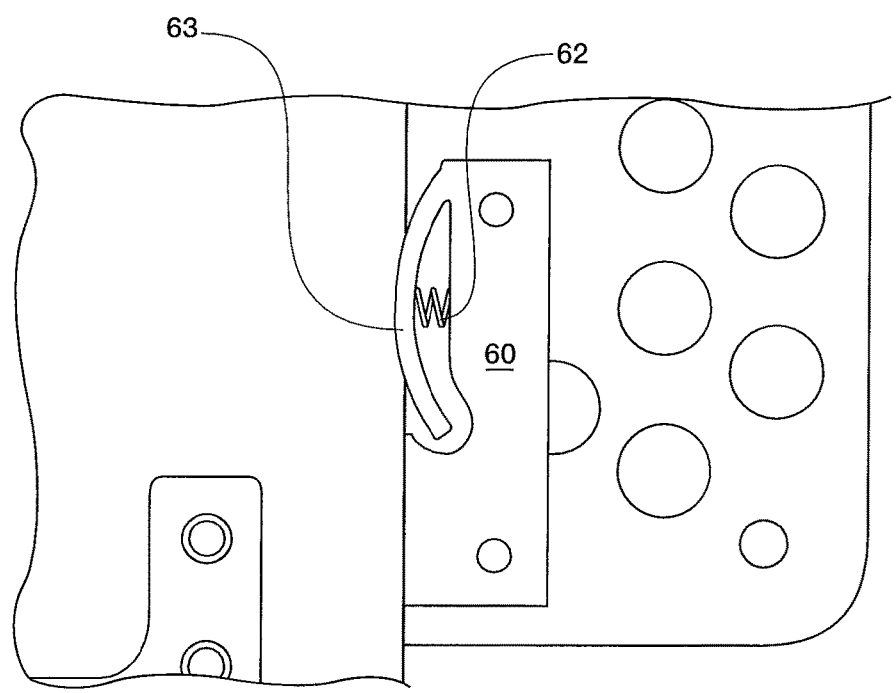
FIG. 14 is a close-up of the spring and lever of the friction assembly.

FIG. 6 depicts seat system 10 including backrest 13 with substantially immovably affixed seat mount 30 attached there to. Rail 51, the preferred sliding mechanism, is slidably engaged with seat mount 30 at carriage 52 (best shown in FIG. 9). Headrest mount 21 connects to headrest, preferably at center panel 22. Up and down movement of headrest relative to seat is regulated by force exerted by nylon friction mechanism 60 on rail 51. More specifically, adjustment of set screw 61 (FIG. 13) controls compression of spring 62, which affects frictional force of lever 63 on sliding rail 51. This is shown in greater detail in FIG. 14.

Figure 7:
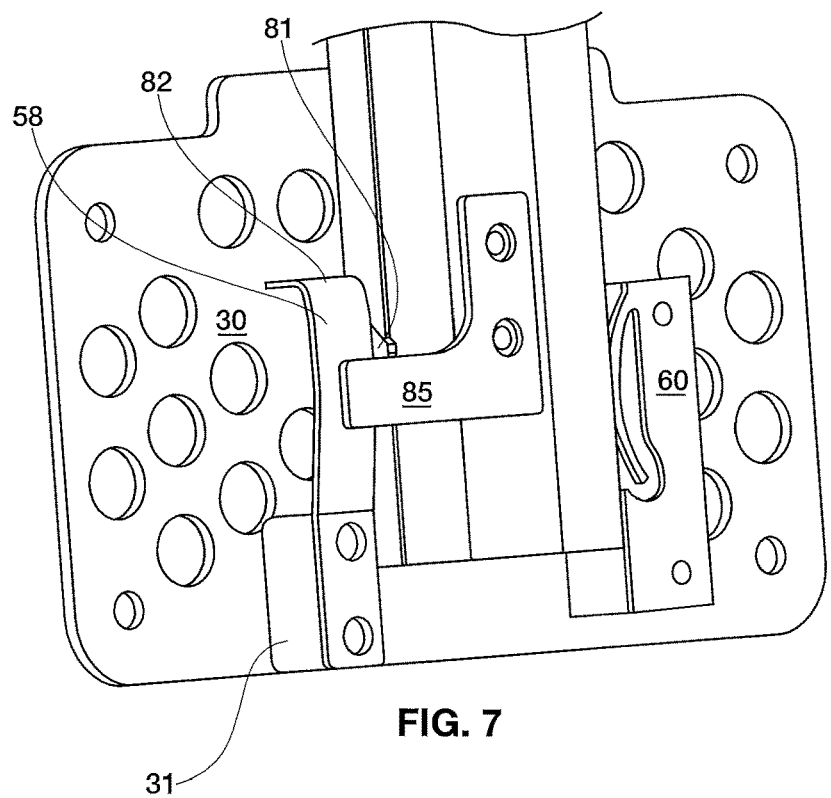
FIG. 7 is a perspective view of a rail engaged with a seat mount including up stop mechanisms.
Figure 8:
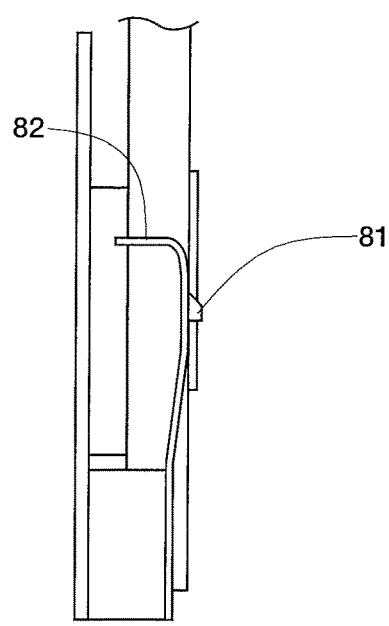
FIG. 8 depicts a side view of FIG. 7.

As best shown in FIG. 7, depression of quick release 58 disengages tab 81 from catch 85, thereby allowing entire assembly including headrest and rail 81 to be removed from seat mount 30. Headrest removal is intended to be performed by airline personnel, and not airline passengers. Quick release mechanism 58 is connected to seat mount 30 at spacer 31. Engagement of catch 85 to tab 81 constitutes an up-stop mechanism.

Figure 10:
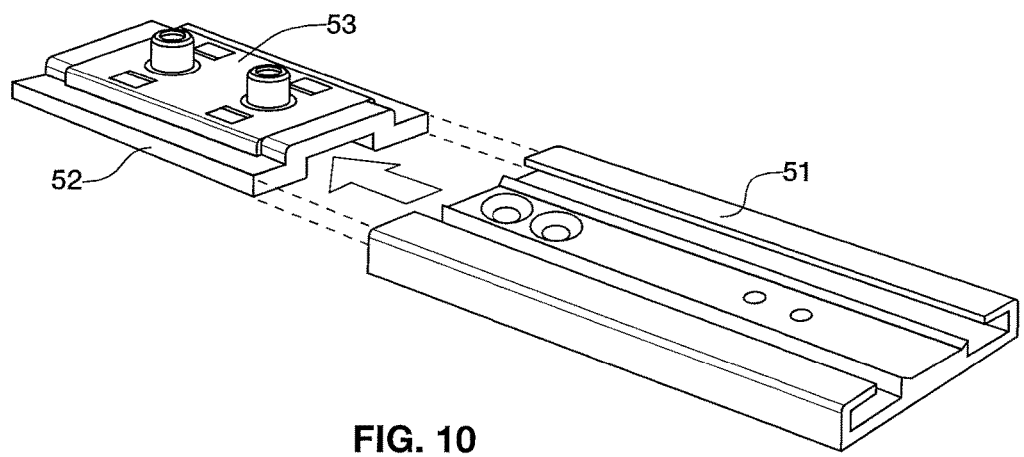
FIG. 10 depicts a carriage positioned for engagement with a rail.
Figure 11:
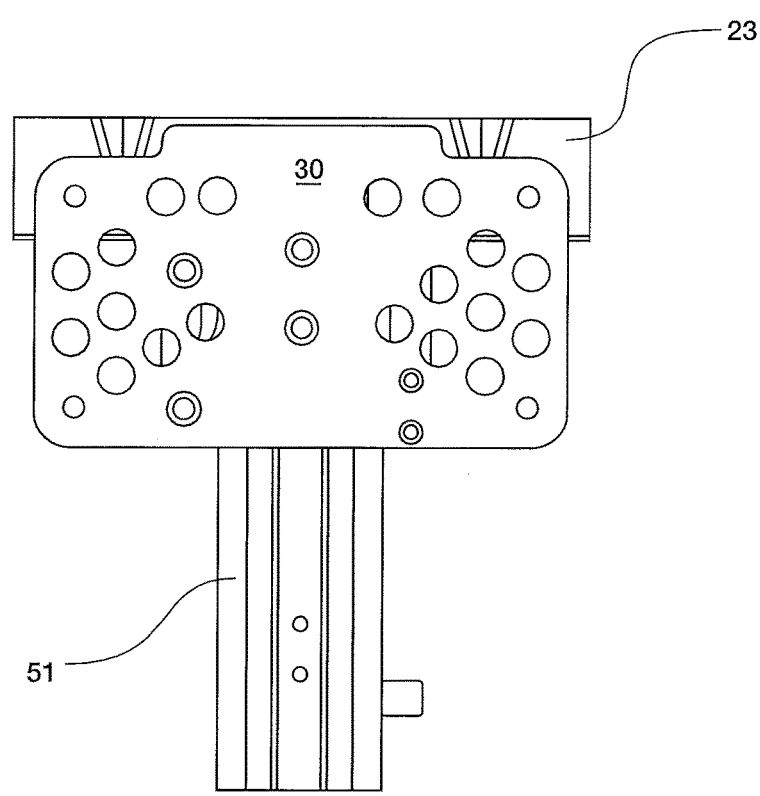
FIG. 11 shows a seat mount engaged with a rail that is attached to a headrest.
Figure 12:
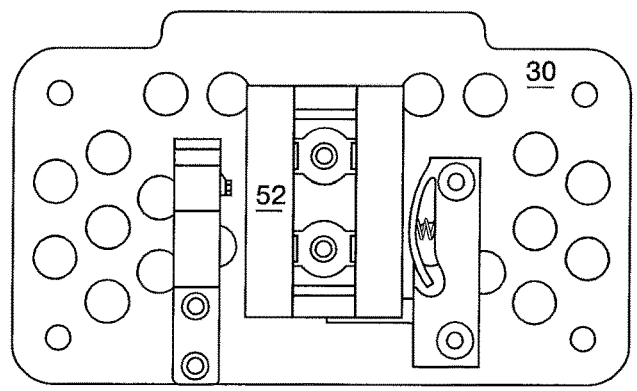
FIG. 12 shows a carriage affixed to a seat mount.

FIG. 10 depicts the engagement between carriage 52 and rail 51. Carriage plate 53 provides means for connecting carriage to seat mount 30. Preferably carriage 52 is part number NS-02-40 from Igus Inc. of East Providence, R.I. Preferably rail 51 is part number NS-01-40 from Igus Inc. of East Providence, R.I.

FIGS. 16-20 depict an alternative embodiment of the present invention including alternative sliding assembly 90 that employs a plurality of rollers 92 having low friction bearings that allow upward and downward passage of rail 51. Phenolic pads 96 along longitudinal edges of rail contact rollers 92 for additional friction. This embodiment may also employ leaf spring 57 between seat mount 30 and rail 51 to provide friction and quick release functionality. More specifically, friction leaf spring 57 is substantially permanently affixed to seat mount 30, such that when rail 51 is engaged with rollers 52, friction leaf spring is maintained between rail and seat mount with lever 55 (FIG. 19) protruding downwardly.

Certain modifications and improvements will occur to those skilled in the art upon a reading of the foregoing description. By way of example, while carriage assembly and rollers are provided as the exemplary mechanisms for facilitating movement of the headrest relative to the seat mount, it should be understood that other mechanisms could be employed. It should be understood that all such modifications and improvements have been deleted herein for the sake of conciseness and readability but are properly within the scope of the following claims.

I claim:

1. A seat system for a passenger aircraft, said seat system comprising:
   (a) at least one passenger seat; and
   (b) an adjustable headrest attached to said passenger seat, said adjustable headrest including a central panel and at least two pairs of side panels positioned in a row, each of said pairs connected to said central panel with a vertically articulating friction joint including a torque insert between each panel, each of said friction joints separating each of said pairs one from another, and wherein said torque insert provides 100% of a specified torque in one direction, and less than 100% of said specified torque in the opposite direction.

2. The seat system according to claim 1, further including a seat back tray table attached to the back of said passenger seat.

3. The seat system according to claim 2, wherein said seat back tray table attached to the back of said passenger seat is movable between a first storage position and a second deployed position.

4. The seat system according to claim 1, wherein said passenger seat further includes a display attached to the back of said passenger seat.

5. The seat system according to claim 1, wherein said passenger seat includes a base frame, a seat component attached to said base frame and a backrest attached to said base frame adjoining the seat component.

6. The seat system according to claim 5, wherein said passenger seat further includes an upholstery package.

7. The seat system according to claim 6, wherein said passenger seat further includes a trim package.

8. An adjustable headrest for a passenger seat, said adjustable headrest comprising:
(a) a plurality of panels including a center panel and at least two pairs of side panels;
(b) a plurality of vertically articulated friction joints each including a torque insert, each of said friction joints separating each of said pairs one from another, and wherein said torque insert provides 100% of a specified torque in one direction, and less than 100% of said specified torque in the opposite direction;
(c) a sliding mechanism to facilitate vertical displacement of said plurality of panels, said sliding mechanism connected to said center panel; and
(d) a quick release mechanism to facilitate removal of said plurality of panels from the passenger seat, said quick release mechanism engaged with said sliding mechanism.

9. The adjustable headrest according to claim 8, wherein the uppermost edges of said panels are substantially linearly aligned.

10. The adjustable headrest according to claim 9, wherein the bottommost edges of said panels are substantially linearly aligned.

11. The adjustable headrest according to claim 8, wherein an elongated gap is formed between each panel, with each gap substantially similar and parallel one-to-another.

12. The adjustable headrest according to claim 8, wherein said plurality of panels is greater than 6 panels.

13. The adjustable headrest according to claim 12, wherein said plurality of panels is 7 panels including said central panel and three pair of side panels.

14. The adjustable headrest according to claim 8, wherein the distal ends of the outermost two panels of said plurality of panels are thickened.

15. The adjustable headrest according to claim 8, wherein the surface area of the front surface of said center panel is less than the surface area of the back surface of said center panel.

16. The adjustable headrest according to claim 8, wherein said plurality of vertically articulated joints each consist of a hinge integrally formed from adjacent panels.

17. The adjustable headrest according to claim 8, wherein said quick release mechanism is a friction leaf spring.

18. The adjustable headrest according to claim 8, wherein said quick release mechanism includes a lever for disengaging from said sliding mechanism.

19. The adjustable headrest according to claim 8, wherein said vertically articulated joints each include a mechanical stop.

20. The adjustable headrest according to claim 8, further including a mounting bracket releasably engaged with said sliding mechanism, said mounting bracket configured for substantially permanent attachment to a passenger airline seat back.

21. The adjustable headrest according to claim 20, wherein said mounting bracket includes a carriage for receiving said sliding mechanism.

22. A seat system for a passenger aircraft, said seat system comprising:
(a) at least one passenger seat;
(b) an adjustable headrest attached to said passenger seat, said adjustable headrest including
    (i) a plurality of panels including a center panel and at least two pairs of side panels;
    (ii) a plurality of vertically articulated joints each including a torque insert, each of said joints separating each of said pairs one from another, and wherein said torque insert provides 100% of a specified torque in one direction, and less than 100% of said specified torque in the opposite direction;
    (iii) a sliding mechanism to facilitate vertical displacement of said plurality of panels, said sliding mechanism connected to said center panel; and
    (iv) a quick release mechanism to facilitate removal of said plurality of panels from the passenger seat, said quick release mechanism engaged with said sliding mechanism; and
(c) a seat back tray table attached to the back of said passenger seat.

23. The seat system according to claim 22, wherein said quick release mechanism is a friction leaf spring.

24. The seat system according to claim 22, wherein said quick release mechanism includes a lever for disengaging from said sliding mechanism.

25. The seat system according to claim 22, wherein said seat back tray table attached to the back of said passenger seat is movable between a first storage position and a second deployed position.

26. The seat system according to claim 22, wherein said passenger seat further includes a display attached to the back of said passenger seat.

27. The seat system according to claim 22, wherein said passenger seat includes a base frame, a seat component attached to said base frame and a backrest attached to said base frame adjoining the seat component.

28. The seat system according to claim 27, wherein said passenger seat further includes an upholstery package.

29. The seat system according to claim 28, wherein said passenger seat further includes a trim package.

30. The seat system according to claim 22, wherein the uppermost edges of said panels are substantially linearly aligned.

31. The seat system according to claim 30, wherein the bottommost edges of said panels are substantially linearly aligned.

32. The seat system according to claim 22, wherein an elongated gap is formed between each panel, with each gap substantially similar and parallel one-to-another.

33. The adjustable headrest according to claim 22, wherein said plurality of panels is greater than 6 panels.

34. The seat system according to claim 33, wherein said plurality of panels is 7 panels including said central panel and three pair of side panels.

35. The seat system according to claim 22, wherein the distal ends of the outermost two panels of said plurality of panels are thickened.

36. The seat system according to claim 22, wherein the surface area of the front surface of said center panel is less than the surface area of the back surface of said center panel.

37. The seat system according to claim 22, wherein said plurality of vertically articulated joints each consist of a hinge integrally formed from adjacent panels.

38. The seat system according to claim 22, further including a mounting bracket releasably engaged with said sliding mechanism, said mounting bracket configured for substantially permanent attachment to a passenger airline seat back.

39. The seat system according to claim 38, wherein said mounting bracket includes a carriage for receiving said sliding mechanism.

40. The seat system according to claim 22, wherein said vertically articulated joints each include a mechanical stop.

* * * * *